United States Patent
Schweid et al.

(10) Patent No.: US 11,883,881 B2
(45) Date of Patent: Jan. 30, 2024

(54) SYSTEM AND METHOD FOR OPERATING A MATERIAL DROP EJECTING THREE-DIMENSIONAL (3D) OBJECT PRINTER TO PREVENT QUANTIZATION ERROR IN PERIMETERS OF A THREE-DIMENSIONAL PRINTED OBJECT

(71) Applicants: Xerox Corporation, Norwalk, CT (US); Palo Alto Research Center Incorporated, Palo Alto, CA (US)

(72) Inventors: Stuart A. Schweid, Pittsford, NY (US); David A. Mantell, Rochester, NY (US); Christopher T. Chungbin, Rochester, NY (US); David G. Tilley, Williamson, NY (US); Walter Hsiao, San Mateo, CA (US); PriyaankaDevi Guggilapu, Webster, NY (US); Daniel Cormier, Pittsford, NY (US); Dinesh Krishna Kumar Jayabal, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 17/157,448

(22) Filed: Jan. 25, 2021

(65) Prior Publication Data
US 2022/0234110 A1    Jul. 28, 2022

(51) Int. Cl.
| B33Y 50/02 | (2015.01) |
| B22F 10/85 | (2021.01) |
| B33Y 10/00 | (2015.01) |
| B33Y 30/00 | (2015.01) |
| B22F 12/53 | (2021.01) |
| B22F 10/22 | (2021.01) |
| B22D 23/00 | (2006.01) |

(52) U.S. Cl.
CPC ............ *B22F 10/85* (2021.01); *B22D 23/003* (2013.01); *B22F 10/22* (2021.01); *B22F 12/53* (2021.01); *B33Y 10/00* (2014.12); *B33Y 30/00* (2014.12); *B33Y 50/02* (2014.12)

(58) Field of Classification Search
CPC ...................................................... B33Y 50/02
See application file for complete search history.

(56) References Cited

U.S. PATENT DOCUMENTS

| 2015/0266235 | A1 | 9/2015 | Page |
| 2015/0352781 | A1* | 12/2015 | Hosier ................. B29C 64/112 425/150 |
| 2018/0036951 | A1* | 2/2018 | Harayama ......... H01L 21/67051 |
| 2018/0104912 | A1 | 4/2018 | Bastian et al. |
| 2018/0229446 | A1 | 8/2018 | Bastian et al. |
| 2018/0297114 | A1* | 10/2018 | Preston ................. B29C 64/165 |
| 2022/0055307 | A1* | 2/2022 | Shin ........................ B29C 64/40 |
| 2022/0168812 | A1* | 6/2022 | Gibson .................. B33Y 10/00 |

OTHER PUBLICATIONS

Ulichney, Dithering with Blue Noise, Jan. 1988, Proceeding of the IEEE, vol. 76, pp. 56-79 (Year: 1988).*

* cited by examiner

*Primary Examiner* — Suresh Suryawanshi
(74) *Attorney, Agent, or Firm* — Maginot Moore & Beck LLP (57) ABSTRACT

A slicer in a material drop ejecting three-dimensional (3D) object printer determines the number of material drops to eject to form a perimeter in an object layer and distributes a quantization error over the layers forming the perimeter. The slicer also identifies the location for the first material drop ejected to form the perimeter using a blue noise generator.

8 Claims, 4 Drawing Sheets

SYSTEM AND METHOD FOR OPERATING A MATERIAL DROP EJECTING THREE-DIMENSIONAL (3D) OBJECT PRINTER TO PREVENT QUANTIZATION ERROR IN PERIMETERS OF A THREE-DIMENSIONAL PRINTED OBJECT

TECHNICAL FIELD

This disclosure is directed to three-dimensional (3D) object printers that eject drops of material to form three-dimensional (3D) objects and, more particularly, to the formation of perimeters in 3D objects manufactured with those printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject drops of melted materials, such as photopolymers or elastomers. The printer typically operates one or more ejectors to form successive layers of the thermoplastic material that form a three-dimensional printed object with a variety of shapes and structures. After each layer of the three-dimensional printed object is formed, the plastic material is cured so it hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. An uninsulated electrically conducting wire is wrapped around the chamber. An electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magnetohydrodynamic printer.

In known 3D object printers that extrude thermoplastic material continually to form perimeters and infills of printed objects, the amount of material extruded per unit length of a closed perimeter is independent of the perimeter length. In 3D object printers that eject drops of thermoplastic material or melted metal, however, the process is not continuous. Instead, the closed perimeter is printed using a discrete number of drops. If the distance from the last drop printed to the first drop printed is not equal to the drop spacing used to form the remainder of the perimeter, a local anomaly occurs that results in local part deformity, especially if the error is repeated in successive layers. Even if the spacing is changed, the amount of material in the layers of a perimeter results in incorrect part height.

Drop on demand based 3D object printers typically print drops at a predefined rate per unit of distance to produce a fixed density. These printers are typically raster based printers. Combining drop on demand printing with toolpath movement while printing requires new constraints for the printing. In extrusion printers, the amount of material extruded is an analog value. In drop on demand printing, however, the ejection of individual drops affects the formation of perimeters and borders as well as the infill of the part. As an example, if a cylinder is being formed, each layer of the cylinder is printed as a circle having the same radius. If, for example, the distance between drops along the perimeter is nominally 1 mm, then a 2 mm radius circle needs 4□ drops per layer, which is about 12.57 drops. For each layer, the drops could be spaced at a standard spacing and then the last (i.e. $13^{th}$) drop could either be included or excluded. Consequently, a choice exists for printing the cylinder layer perimeter with either 12 or 13 drops. If the $13^{th}$ drop is excluded, then the distance between the first drop printed in the perimeter and the last or twelfth drop is 1.57× the distance between consecutively ejected drops, which in this example is 1.57 mm. Thus, a local void results. Conversely, if a thirteenth drop is ejected as the last drop in the perimeter, then the distance between the first drop and last drop in this example is only 0.57 mm, which may produce a local protrusion.

Some known methods can reduce, but not eliminate, this problem for all possible perimeters. One approach is to move the starting drop of the various layers forming the closed perimeter around randomly. While this approach does not completely remove the problem, it ensures that the local aberration is at a different location for each layer so the errors do not accumulate at a single position. In scenarios where the drop spacing error is close to one-half of the drop spacing distance, the defect can be very noticeable although it is randomized in location. Another possible correction is to change the spacing of the ejected drops to an integer value. In a circular layer for the cylinder as noted in the example above, the number of drops in each layer is rounded to thirteen to attenuate the last drop to the first drop gap. But, especially in cases where the number of drops per perimeter are small, the height of the error can build quickly. The problem with these two possible solutions is that the amount of material in the layer perimeter is incorrect, either locally or globally. Both approaches in different situations can produce errors in height and shape of the perimeter and possibly cause problems with structural stability in the finished part, especially for thin cross-sectional portions. Being able to form perimeters in parts manufactured with printers that eject discrete material drops at appropriate drop spacings for maintaining part integrity in each layer of the perimeter would be beneficial.

SUMMARY

A new method of operating a material drop ejecting 3D object printer can form perimeters in parts with discrete material drops at appropriate drop spacings for part integrity in each layer of the perimeter. The method includes identifying a perimeter to be formed in a first object layer by execution of machine ready instructions generated from an object layer data model, identifying a number of material drops to eject to form the perimeter in the first object layer and a first quantization error for the first object layer, the identified number of material drops to form the perimeter in the first object layer being a first integer, identifying a location for a first material drop to be ejected to form the perimeter in the first object layer, modifying the machine ready instructions generated from the object layer data model using the identified number of material drops and the identified location for the first material drop, and executing the modified machine-ready instructions to operate the material drop ejecting 3D object printer to form the perimeter in the first object layer to be formed by the material drop ejecting 3D object printer.

A new material drop ejecting 3D object printer can form perimeters in parts with discrete material drops at appropriate drop spacings for part integrity in each layer of the perimeter. The material drop ejecting 3D object printer includes a melter configured to receive and melt a bulk metal, an ejection head having a nozzle that is fluidly connected to the melter to receive melted bulk metal from the melter, a platform positioned opposite the ejection head, at least one actuator operatively connected to at least one of the platform and the at least one ejection head, the at least one actuator being configured to move the at least one of the platform and the at least one ejection head relative to one another, and a controller operatively connected to the melter, the at least one ejection head, and the at least one actuator. The controller is configured to identify a perimeter to be formed in a first object layer by execution of machine ready instructions generated from an object layer data model, identify a number of material drops to eject to form the perimeter in the first object layer and a first quantization error for the first object layer, the identified number of material drops to form the perimeter in the first object layer being a first integer, identify a location for a first material drop to be ejected to form the perimeter in the first object layer, modify the machine ready instructions generated from the object layer data model using the identified number of material drops and the identified location for the first material drop, and execute the modified machine-ready instructions to operate the material drop ejecting 3D object printer to form the perimeter in the first object layer to be formed by the material drop ejecting 3D object printer.

BRIEF DESCRIPTION OF THE DRAWINGS

The foregoing aspects and other features of a method of operating a material drop ejecting 3D object printer and new material drop ejecting 3D object printer that forms perimeters in parts with discrete material drops at appropriate drop spacings for part integrity in each layer of the perimeter are explained in the following description, taken in connection with the accompanying drawings. The method and printer described below distribute the material density layer error occurring in each layer forming a perimeter across the layers in a manner that makes the error imperceptible to the human eye. This distribution takes the error generated by each quantization step and distributes it to subsequent spatial or temporal quantization steps.

DETAILED DESCRIPTION

For a general understanding of a 3D object printer and its operation that distributes quantization errors across the different layers of a perimeter in an additive manufactured part as well as for the details for the printer and its operation, reference is made to the drawings. In the drawings, like reference numerals designate like elements.

Figure 1:
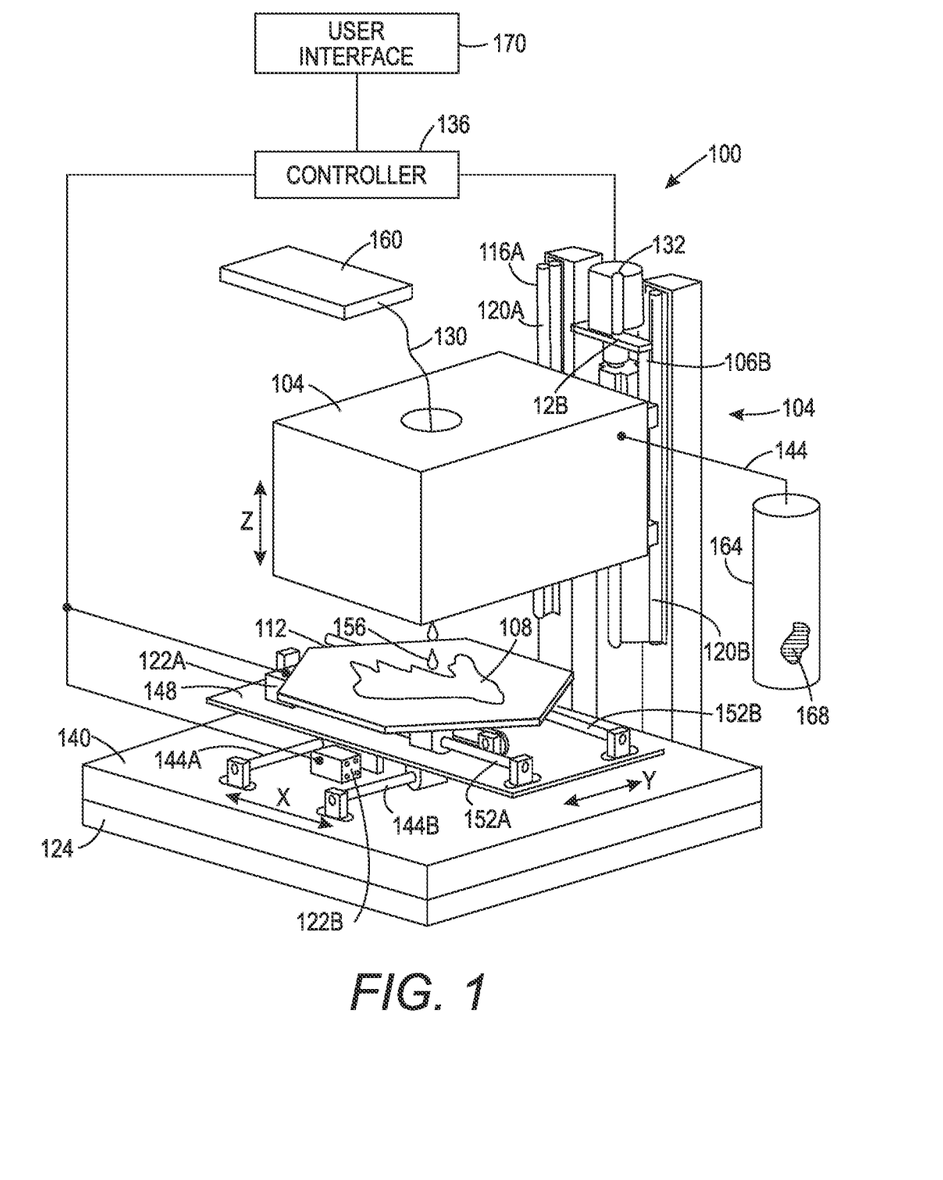
FIG. 1 depicts a metal drop ejecting 3D metal object printer that distributes quantization error over the layers forming a perimeter and that determines the location for a first ejected metal drop that forms the perimeter in each layer.

FIG. 1 illustrates an embodiment of a melted metal 3D object printer 100 that can be equipped with a modified slicer program implemented with a controller to distribute quantization errors across the different layers of a perimeter in an additive manufactured part. Although the description below is made with reference to the metal drop ejecting 3D object printer of FIG. 1, the slicer program can be used with a single nozzle or multi-nozzle material drop ejecting 3D object printer.

In the printer of FIG. 1, drops of melted bulk metal are ejected from a ejection head 104 having a single nozzle and drops from the nozzle form lines for layers of a perimeter of an object 108 on a platform 112. As used in this document, the term "bulk metal" means conductive metal available in aggregate form, such as wire of a commonly available gauge or pellets of macro-sized proportions. A source of bulk metal 160, such as metal wire 130, is fed into the ejection head and melted to provide melted metal for a chamber within the ejection head. An inert gas supply 164 provides a pressure regulated source of an inert gas 168, such as argon, to the chamber of melted metal in the ejection head 104 through a gas supply tube 144 to prevent the formation of metal oxide in the ejection head.

The ejection head 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejection head 104 to move the ejection head along the z-axis tracks 116A and 166B. The actuator 132 is operated by a controller 136 to maintain a distance between the single nozzle of the ejection head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejection head 104. Performing this X-Y planar movement of platform 112 as drops of molten metal 156 are ejected toward the platform 112 forms a line of melted metal drops on the object 108. Controller 136 also operates actuator 132 to adjust the vertical distance between the ejection head 104 and the most recently formed layer on the substrate to facilitate formation of other structures on the object. While the molten metal 3D object printer 100 is depicted in FIG. 1 as being operated in a vertical orientation, other alternative orientations can be employed. Also, while the embodiment shown in FIG. 1 has a platform that moves in an X-Y plane and the ejection head moves along the Z axis, other arrangements are possible. For example, the ejection head 104 can be configured for movement in the X-Y plane and along the Z axis.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejection head control signals output to the ejection head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, or the controller can access through a server or the like a remote database in which the digital data model is stored, or a computer-readable medium in which the digital data model is stored can be selectively coupled to the controller 136 for access. This three-dimensional model or other digital data model is processed by a slicer implemented with the controller to produce data identifying each layer of an object and then generate machine-ready instructions for execution by the controller 136 in a known manner to operate the components of the printer 100 and form the metal object corresponding to the model. The generation of the machine-ready instructions can include the production of intermediate models, such as when a CAD digital data model for an object is converted into a STL object layer data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 136 executes the machine-ready instructions to control the ejection of the melted metal drops from the ejection head 104, the positioning of stage 148 and the platform 112, as well as the distance between the ejection head 102 and the uppermost layer of the object 108 on the platform 112.

The slicer implemented by the controller 136 distributes the quantization error that occurs in different layers of a perimeter formed in a part made by the system 100 and determines the position of the first drop of ejected material that forms the perimeter in the layer, although the slicer can be implemented with another processor in system 100. The slicer generates the 3D object layer data used to generate the machine-ready instructions that operate the components of the printer to form the object corresponding to the digital data model. A commonly used format for a digital data model is the STL format but other formats, such as 3MF, AMF, and PLY can be used. In the STL format, an object surface is defined by the edges and corners of triangular faces. The slicer converts these STL data into two-dimensional (2D) horizontal slices of the object and then generates the machine-ready instructions that operate the actuators to move the ejection head along tool paths and that operate the ejection head to eject metal drops to form the object. This conversion, in one embodiment, results in g-code, which initializes the printing system and defines the paths along which the ejection head is moved and that operate the ejection head to eject melted metal drops to form the layers of the part.

The distribution of the quantization error across the layers of a perimeter that is performed by the slicer implemented by the controller 136 of FIG. 1 ensures that the long-term accumulated error is never more than one quantization unit. This property cannot be achieved with random rounding. Additionally, the quantization error distribution ensures that transitions between quantized states happen at the highest possible frequencies so that errors do not aggregate over a long time or distance. In the slicer that addresses quantization error in perimeter layers, the error distribution is in the Z or vertical direction only so all of the error arising from the quantization of the material in each perimeter layer is distributed to the next layer.

Algorithmically, the quantization error is distributed as follows: the drop error for the process is initialized to zero (drop_error=0) and for each layer:
 drops_accum=drops_float+drop_error;
 drops_layer=floor(drops_accum+0.5);
 drop_error=drops_accum−drops_layer, where drops_float is the desired number of drops or amount of drop mass for printing a perimeter expressed as a floating point or non-integer number, which is 12.57 in the example noted previously, and the drop_error identified for a layer is used for identifying the drops_accum in the next layer.

Following identification of the number of drops for a perimeter in a layer, the values for the virtual axis of the drops during a move are determined. In the machine-ready instructions, such as g-code, each drop is identified by three coordinates, (x, y, e). The x and y coordinates identify points that define a path for movement of the ejector in the X-Y plane of the platform and the e coordinate identifies an accumulated number of drops ejected. The drops are ejected at intervals within a drop spacing parameter. As used in this document, the term "drop spacing" means a predefined distance between the centers of adjacent drops ejected as an ejector moves along a path in a layer. A threshold is defined for ejector movement along a path. The threshold is a particular portion of the drop spacing. For example, 0.5 can be selected as a threshold for use with the defined drop spacing for a path, which means that a drop is ejected at the halfway position along the drop spacing. By changing the threshold, the position of an ejected drop can be changed within the drop spacing.

As an example, the three coordinates (x, y, e) for points defining a closed ejector path in a layer is shown in the following table:

| drop number | x coordinate | y coordinate | e coordinate |
|---|---|---|---|
| 1 | 2.000 | 0 | 94.2200 |
| 2 | 1.6180 | 1.1756 | 95.4766 |
| 3 | 0.6180 | 1.9021 | 96.7333 |
| 4 | −0.6180 | 1.9021 | 97.9899 |
| 5 | −1.6180 | 1.1756 | 99.2465 |
| 6 | −2.000 | 0.0000 | 100.5032 |
| 7 | −1.6180 | −1.1756 | 101.7598 |
| 8 | −0.6180 | −1.9021 | 103.0165 |
| 9 | 0.6180 | −1.9021 | 104.2731 |
| 10 | 1.6180 | −1.1756 | 105.5297 |
| 11 | 2.0000 | −0.0000 | 106.7864 |

These values represent the ten points, since the first and the eleventh points are at the same x,y location, that define a closed perimeter that is a circle in a layer. The e coordinate represents the accumulated drop count at the beginning of the path to the return to the origin. The table indicates that the ejector ejects 12.57 drops for a 0.5 threshold of the drop spacing while the ejector traverses the circular path. As noted above, the controller cannot operate the ejector to eject 12.57 drops but, instead, operates the ejector to eject twelve drops in some layers and operates the ejector to eject thirteen drops in other layers. Thus, the floating point numbers for the e coordinates shown in the table need to be scaled to a twelve drop or thirteen drop scheme. The results of this scaling are shown in the following two tables. First shown is the table for the twelve drops:

| drop number | x coordinate | y coordinate | e coordinate |
|---|---|---|---|
| 1 | 2.000 | 0 | 94.2200 |
| 2 | 1.6180 | 1.1756 | 95.5200 |
| 3 | 0.6180 | 1.9021 | 96.8200 |
| 4 | −0.6180 | 1.9021 | 98.1200 |
| 5 | −1.6180 | 1.1756 | 99.4200 |
| 6 | −2.000 | 0.0000 | 100.7200 |
| 7 | −1.6180 | −1.1756 | 102.0200 |
| 8 | −0.6180 | −1.9021 | 103.3200 |
| 9 | 0.6180 | −1.9021 | 104.6200 |
| 10 | 1.6180 | −1.1756 | 105.9200 |
| 11 | 2.0000 | −0.0000 | 107.2200 |

Because the difference between the first e coordinate and the last e coordinate is thirteen, thirteen drops are ejected to form the circular perimeter as the ejector is moved along the (x,y) path.

Next the table for the twelve drop path is shown:

| drop number | x coordinate | y coordinate | e coordinate |
|---|---|---|---|
| 1 | 2.000 | 0 | 94.2200 |
| 2 | 1.6180 | 1.1756 | 95.4200 |
| 3 | 0.6180 | 1.9021 | 96.6200 |
| 4 | −0.6180 | 1.9021 | 97.8200 |
| 5 | −1.6180 | 1.1756 | 99.0200 |
| 6 | −2.000 | 0.0000 | 100.2200 |
| 7 | −1.6180 | −1.1756 | 101.4200 |
| 8 | −0.6180 | −1.9021 | 102.6200 |
| 9 | 0.6180 | −1.9021 | 103.8200 |
| 10 | 1.6180 | −1.1756 | 105.0200 |
| 11 | 2.0000 | −0.0000 | 106.2200 |

Because the difference between the first e coordinate and the last e coordinate is twelve, twelve drops are ejected to form the circular perimeter as the ejector is moved along the (x,y) path. Using the coordinates, the g-code is generated for the twelve drop and the thirteen drop perimeters in different layers.

This error distribution calculation determines the number of drops to use in each perimeter layer, but it does not determine the relation of the position of drops from one layer to another. In cases where the number of drops in each layer is the same, the above-identified error distribution produces greater structural integrity if the drops in one layer are offset from the drops in a previous layer by one-half of a cycle. This position shifting is analogous to shifting successive brick layers by half a brick length. Similarly, this drop position shifting can be accomplished in the simple cylindrical object example noted previously by using one-half of the drop spacing distance shift in the location of the first drop used to form a perimeter.

Figure 2:
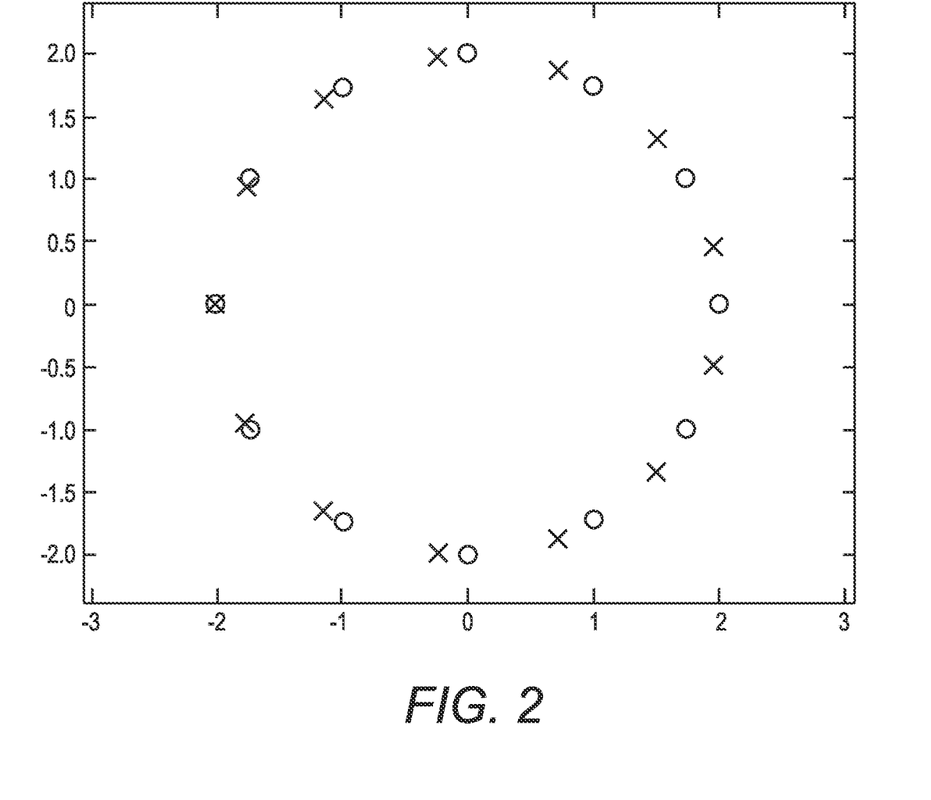
FIG. 2 is a diagram of the position of drops forming a perimeter in a subsequent layer with respect to the position of drops forming the perimeter in a previously formed layer.

One problem with the simple shifting of one-half of the drop spacing distance occurs, however, when the number of drops in the perimeter changes. If the number of drops increases by 1, for example, then a beat frequency arises between adjacent layers and the drop spacing distance goes from 0.5 mm to −5 mm as the ejection head follows the perimeter. Since the phase relationship is always 180 degrees out of phase for the start of the perimeter, a location exists along the perimeter where the drops between successive layers always line up and drops nearby are very nearly aligned. This synchronization permits error accumulation as the perimeter is built. In the case where the desired fractional number of drops per layer is 0.5, the number of drops per layer toggle between the two values. This toggling results in the alignment of drops, that is a subsequent drop landing on a previously ejected drop at the same location along the perimeter in every layer and other drops in the nearby vicinity of that location land closely to previously ejected drops. This situation is depicted in FIG. 2 in which the Xs represent drops forming a perimeter in the layer immediately formed before the current layer and the Os represent drops forming the perimeter in a current layer.

To eliminate the problems arising from the interaction of start location phase shifting and quantization error distribution of the drops over the layers of a perimeter, a blue noise generator is used to choose the start location instead of a fixed shift of one-half of the drop spacing distance between layers. The blue noise generator moves the first drop of a next layer by one-half of the drop spacing distance from the first drop of the previously formed layer and then additionally perturbing it an additional distance of between a negative one-half of the drop spacing distance and a positive one-half of the drop spacing distance using a white noise generator that has a triangular probability distribution, which means the probability generator is not uniform. A triangular probability density function (PDF) is easily produced by averaging two white noise PDFs. The final shift amount is remapped to be between a negative one-half of the drop spacing distance and a positive one-half of the drop spacing distance (−π to +π).

In cases where the density of a perimeter in a layer is not uniform compared to a perimeter formed in a previously formed layer, such as areas with overhangs, a phase shift can be defined using the nominal perimeter density, which is the average number of drops per unit length in one layer. This phase shift produces a phase difference between layers that is blue noise distributed near the nominal density, but not full scale, that is, less than +/−one-half of the drop spacing for perimeters having a density lower than the nominal density and approaching white noise distributed for perimeters having densities much larger than the nominal density.

Figure 3:
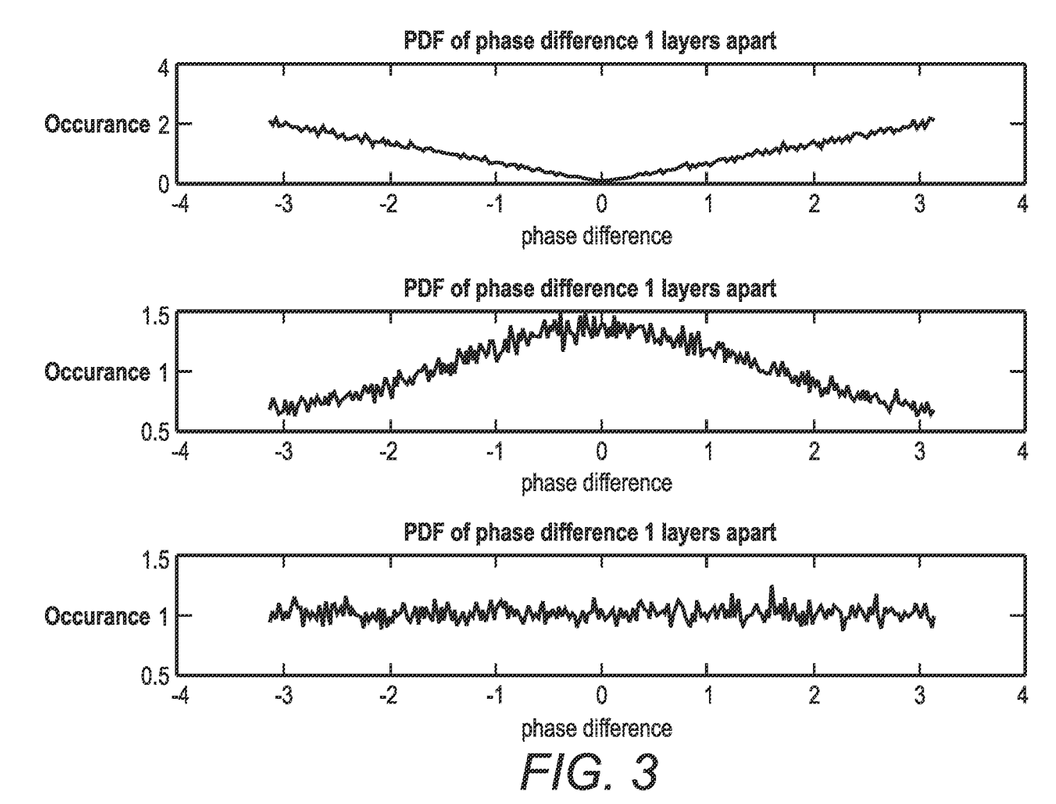
FIG. 3 depicts three probability density functions for adjacent layers, layers separated by an intervening layer, and layers separated by two intervening layers, respectively.

The blue noise generator implemented with the slicer to position the drops for forming a perimeter in a layer assures that the quantization error variation is decorrelated with the drop start location phase variation. The probability density function of the phase difference between adjacent layers and those that are two and three layers apart is shown in FIG. 3. As shown in the figure, the phase relationship between non-adjacent planes quickly decorrelates with use of the blue noise generator to shift the start position of the first drop for a perimeter in a layer. The use of the blue noise generator helps ensure no accumulated beat frequency arises with the use of the quantization error distribution process to determine the number of drops to be ejected for a perimeter in a layer.

Figure 4:
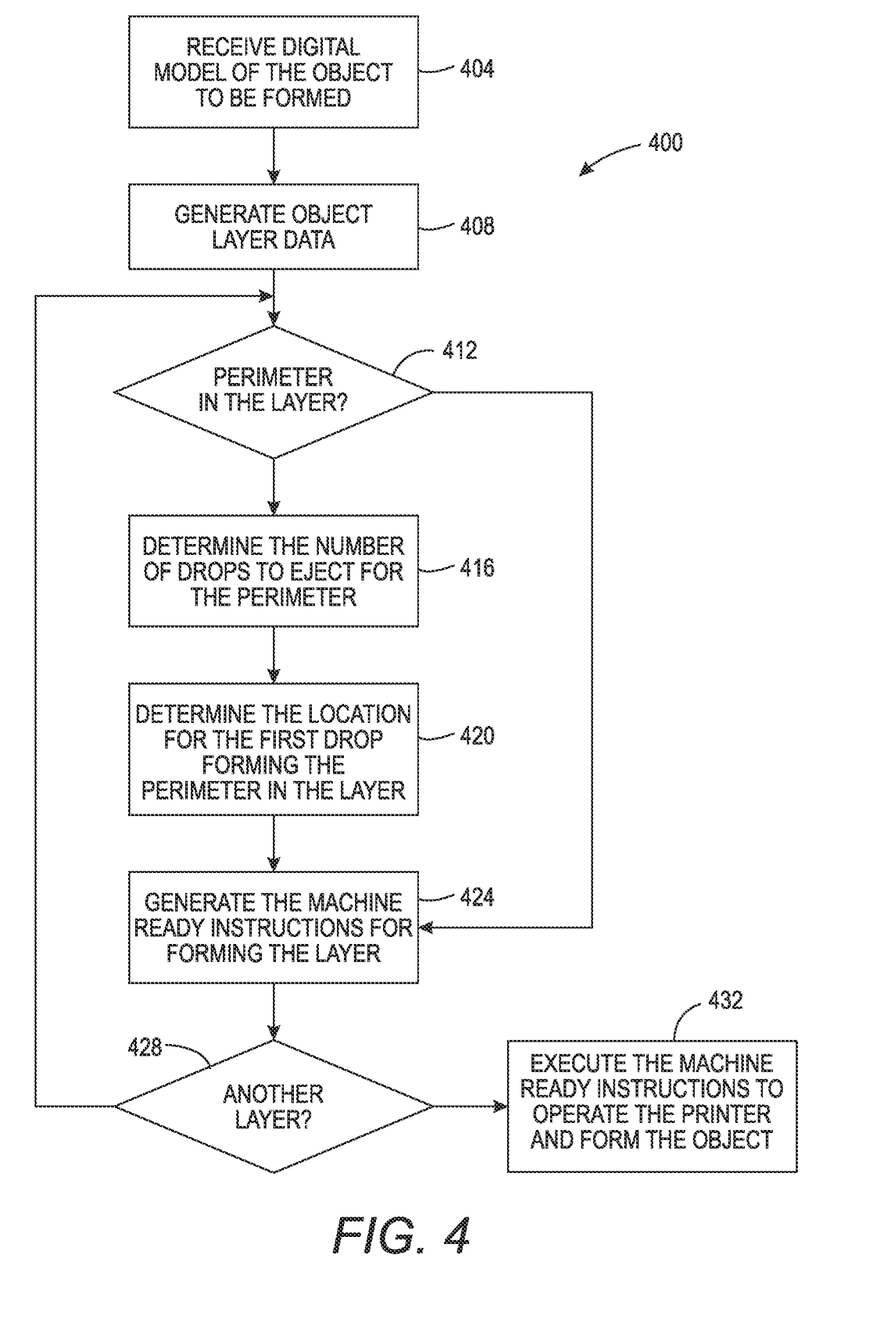
FIG. 4 is a flow diagram of a process implemented by a controller executing a slicer program in the printer of FIG. 1 to distribute quantization error over the layers forming a perimeter and to determine the starting location of a first drop forming the perimeter in each layer.

A process for operating a material drop ejecting 3D object printer to attenuate quantization error and determine the starting drop location for forming a perimeter in a layer is shown in FIG. 4. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 4 is a flow diagram of a process that operates a material drop ejecting 3D object printer, such as printer 10, to attenuate quantization error and determine starting drop location for a perimeter formed in a layer of a 3D object. The process 400 begins with the slicer receiving the digital data model for the object to be produced (block 204). The slicer then generates object layer data and the machine ready instructions to form each layer of the object (block 208). For the first layer, the slicer determines if one or more perimeters are formed in the layer (block 212). Using an error distribution process, such as the algorithm described previously, the number of drops to eject to form the perimeter is determined (block 216). The slicer also determines the location of the first drop that forms the perimeter using one or more drop position shifting techniques, as noted above (block 220). The previously generated machine-ready instructions for operating the printer to form the perimeters in the layer and any infill lines in the layer are modified and stored (block 224). This modification is performed by leaving the X,Y coordinates alone but changing the e values for the gcode instructions as described previously. This change, in effect, alters a feed rate based on distance, for example, drops/mm. Alternatively, if the gcode instructions were described by a set of X,Y coordinates and a feed rate, rather than an e value, then the feed rate, which is a function of time, for example, drops/msec, is changed. If another layer is to be processed (block 228), the machine-ready instructions are generated in the same manner (blocks 212 to 224). Once all of the layers have been processed and the corresponding machine-ready instructions generated, the controller of the printer executes the machine-ready instructions to form the object (block 232).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
a melter configured to receive and melt a bulk metal;
an ejection head having a nozzle that is fluidly connected to the melter to receive melted bulk metal from the melter;
a platform positioned opposite the ejection head;
at least one actuator operatively connected to at least one of the platform and the at least one ejection head, the at least one actuator being configured to move the at least one of the platform and the at least one ejection head relative to one another; and
a controller operatively connected to the melter, the at least one ejection head, and the at least one actuator, the controller being configured to:
identify a perimeter to be formed in a first object layer by execution of machine ready instructions generated from an object layer data model;
identify a number of material drops to eject to form the perimeter in the first object layer and a first quantization error for the first object layer, the identified number of material drops to form the perimeter in the first object layer being a first integer;
identify a location for a first material drop to be ejected to form the perimeter in the first object layer;
modify the machine ready instructions generated from the object layer data model that are to be executed to form the perimeter in the first object layer using the identified number of material drops and the identified location for the first material drop;
execute the modified machine-ready instructions to operate the material drop ejecting 3D object printer to form the perimeter in the first object layer to be formed by the material drop ejecting 3D object printer;
identify a perimeter to be formed in a second object layer of an object layer data model that corresponds to the perimeter to be formed in the first object layer;
distribute the quantization error of the first object layer to a second object layer in the object layer data model;
identify a number of material drops to eject to form the perimeter in the second object layer and a second quantization error for the second object layer, the identified number of material drops to form the perimeter in the second object layer being a second integer number that is different than the first integer number;
identify a location for a first material drop to be ejected to form the perimeter in the second object layer;
modify the machine ready instructions generated from the object data model that are to be executed to form the perimeter in the second object layer using the identified number of material drops and the identified location for forming the perimeter in the second object layer; and execute the modified machine-ready instructions that are to be executed to form the perimeter in the second object layer to operate the material drop ejecting 3D object printer to form the perimeter in the second object layer.

2. The apparatus of claim 1, the controller being further configured to:
identify the distribution of the first quantization error, identify the number of material drops to be ejected to form the perimeter in the second object layer, and identify the second quantization error using a non-integer number for an amount of material or a number of drops used to form the perimeter in the second object layer.

3. The apparatus of claim 2, the controller being further configured to:
identify the distribution of the first quantization error, identify the number of material drops to be ejected to form the perimeter in the second object layer, and identify the second quantization error using the process represented by:

drops_accum=drops_float+drop_error;
drops_layer=floor(drops_accum+0.5);
drop_error=drops_accum−drops_layer, where drops_float is the non-integer number for the number of material drops or amount of drop mass to be ejected to form the perimeter, drops_accum is drops_float adjusted by the first quantization error, drops_layer is the number of material drops to be ejected to form the second object layer, the drop_error is the second quantization error, and the floor function identifies a lower integer number closest to a value for an argument for the function.

4. The apparatus of claim 1, the controller being further configured to:
identify the location for the first material drop to be ejected to form the perimeter in the second object layer by:
shifting the location for the first material drop to be ejected to form the perimeter in the second object layer from the location for the first material drop to be ejected to form the perimeter in the first object layer by one-half of a drop spacing between the location for the first material drop to be ejected to form the perimeter in the first object layer and a location of a next material drop to be ejected to form the perimeter in the first object layer.

5. The apparatus of claim 1, the controller being further configured to:
identify the location for the first material drop to be ejected to form the perimeter in the second object layer by:
using a blue noise generator to identify the location of the first material drop to be ejected to form the perimeter in the second object layer.

6. The apparatus of claim 5, the controller being further configured to use the blue noise generator by:
moving the location of the first material drop to be ejected to form the perimeter in the second object layer by one-half of a drop spacing distance between the first material drop to be ejected to form the perimeter in the first object layer and a location of a next material drop to be ejected to form the perimeter in the first object layer; and
altering the moved location by an additional distance of between a negative one-half of the drop spacing distance and a positive one-half of the drop spacing distance using a white noise generator that has a triangular probability distribution.

7. The apparatus of claim 1, the controller being further configured to modify the machine-ready instructions by:
scaling a plurality of accumulated drop values for a floating point number of drops for forming the perimeter to a plurality of accumulated drop values for the identified first integer number of drops for forming the perimeter in the first layer.

8. The apparatus of claim 7, the controller being further configured to modify the machine-ready instructions by:
scaling a plurality of accumulated drop values for a floating point number of drops or an amount of drop mass to be ejected to form the perimeter to a plurality of accumulated drop values for the identified second integer number of drops for forming the perimeter in the first layer, the plurality of accumulated drop values for the second identified integer number being different than the plurality of accumulated drop values for the first identified integer numbers.

* * * * *